United States Patent Office 2,901,747
Patented Aug. 25, 1959

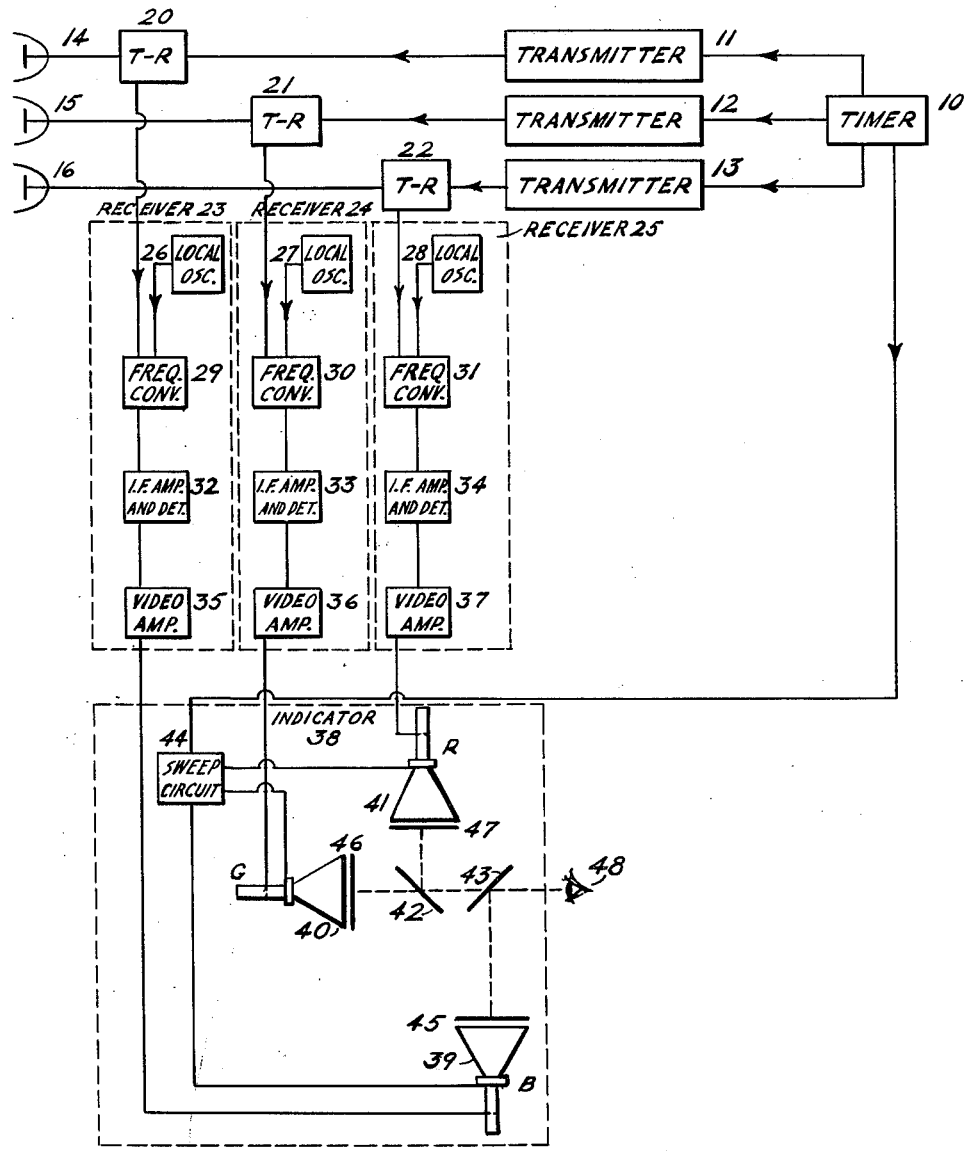

2,901,747
COLOR IDENTIFICATION IN RADAR SYSTEMS

David E. Sunstein, Cynwyd, Pa., assignor to Philco Corporation, Philadelphia, Pa., a corporation of Pennsylvania Application June 7, 1946, Serial No. 674,969

7 Claims. (Cl. 343—17)

This invention relates to improvements in radar systems and the like.

In my co-pending application filed June 7, 1946, Serial No. 674,968, now Patent No. 2,758,298 I describe and claim a novel method and means involving the use of contrasting colors in the visual presentation of radar-derived intelligence as an aid in indicating differences in the character of received signals. As a specific embodiment, I describe means for more readily distinguishing between an object and its surrounding landmass or other environment.

The present invention, which utilizes the basic principles disclosed and claimed in the said co-pending application, further provides, in color, an indication of the character of the object or target and also of the nature of the surrounding landmass or other environment.

In a radar system, the ability of a remote surface to reflect incident electromagnetic waves back to a radar receiver may depend, not only upon the size, surface contour, and material composition of the reflecting surface, but also upon the wavelength of the incident wave. The following examples will illustrate the point. A forest may constitute a rough wave-reflecting surface to very short wavelengths but a comparatively smooth surface to longer waves. If the transmitted frequency is such that the depressions between the trees of the forest are many wavelengths deep, substantial cancellation and absorption of the transmitted energy may occur therein and reflections back to the radar receiver may be appreciably weaker than at substantially longer wavelengths. Clouds, on the other hand, reflect more strongly at the shorter wavelengths than at the longer. Similarly, a rough sea, which returns a substantial amount of energy to the radar receiver from the inclined surface of the wave front, reflects the very short radio waves more strongly than the longer. On the other hand, reflections to the receiver from slightly roughened earth, such as ploughed fields, are substantially equal in strength at all frequencies. Likewise, buildings, bridges, ships, oil tanks, trains, railroad tracks, motor vehicles, aircraft and other metal objects and structures reflect back to the receiver substantially equally at all frequencies, but the strength of the returned energy is considerably greater than in the case of roughened earth. A calm sea returns virtually no energy to the receiver since its surface acts as a mirror and practically all of the transmitted energy is reflected away from the radar set at an angle equal to the angle of incidence.

The foregoing are merely a few of many examples which might be cited to illustrate the fact that at a given radio frequency the reflective properties of objects of equal size may be different for different materials, and that for different frequencies the coefficient of reflection of a given material may be the same or may be substantially different. Consequently, information concerning the character of the reflecting surface may be secured by observing the manner in which it reflects a variety of different radio frequencies.

In the present invention, means are provided whereby a radar operator may readily observe the relative strength of reflected pulse signals at a plurality of widely different frequencies. The operator thus secures an indication of the nature of the reflecting object or surface. To facilitate such observation, means are provided to present the information visually in a color code. If desired, the color code may be so selected that the more important objects are shown in characteristic color. For example, earth may be caused to appear in gray; forest in blue-green; calm water, such as rivers, lakes and the like, in black; and buildings, ships, bridges, and other metal objects, in white. Other objects and surfaces may appear in various shades of color, some of which may be typical and others not at all characteristic.

It is an object of this invention to provide a radar system which is capable of indicating the physical nature of a wave-reflecting surface or object as well as its location and size.

It is another object of this invention to employ contrasting colors in a radar receiver indicator as a means for visually indicating the physical character of a remote object or surface.

In accordance with a feature of this invention, information concerning the nature of a remote object or surface is secured by transmitting, simultaneously or otherwise, a plurality of time-spaced pulse signals at substantially different radio frequencies and by observing the relative strength of the reflected signals received at each of these frequencies.

These and other objects, features and advantages of the present invention will become clear from a consideration of the following description and the accompanying drawing, in which the single figure is a diagrammatic representation of a radar system employing a preferred embodiment of my invention.

In the figure, there is illustrated in block diagram a novel radar system comprising the major components of three individual radar systems combined to function as a unit. For purposes of describing the invention, the combination is represented as having three transmitters, three receivers, three antennas, and three T-R switches. If desired, some of the components which are represented as being in multiple may be replaced with single units common to all three radar circuits. For example, a single antenna may be employed, and under certain circumstances a single transmitter and a single local oscillator may be employed, as is indicated more fully hereinafter.

Referring now to the details of the drawing, there is shown a radar system having a timer 10 for simultaneously triggering transmitters 11, 12 and 13. If desired, the timer may be arranged to fire the transmitters successively instead of simultaneously, as is hereinafter more fully indicated. Each of the transmitters is adapted to generate pulses of radio frequency energy in known manner, the pulse repetition rate being determined by the trigger pulses from timer 10. The duration and carrier frequency of the pulses generated by each transmitter is of course determined by the transmitter circuit, usually by the modulator and magnetron components respectively.

In the system shown in the drawing, each of the three transmitters is preferably arranged to emit pulses equal in duration to those emitted by the others, but each transmitter is arranged to generate a carrier frequency substantially different from that of each of the others. For example, transmitter 11 may be adjusted to generate a carrier frequency of 2000 megacycles; transmitter 12, a carrier frequency of 5000 mc.; and transmitter 13, a carrier frequency of 8000 mc. If the selected carrier frequencies are harmonically related, a single transmitter may be employed, the requirement being that the magnetron, or other R.-F. oscillator, be specially constructed to generate strong harmonics as well as a strong fundamental. Such an oscillator may be built in accordance with the principles described and claimed in my co-pending application filed August 31, 1944, Serial No. 552,143, assigned to Philco Corporation.

Referring again to the drawing, the pulses generated simultaneously by transmitters 11, 12 and 13 are applied to rotatable dipole antennas 14, 15 and and 16. These antennas function as a unit and are preferably ganged so that all propagate waves in the same direction at any given instant. A single stack dipole array may be conveniently substituted for the three antennas shown in the drawing.

T-R switches 20, 21 and 22 are likewise conventional in structure and each operates in customary manner to couple its respective transmitter with its antenna and to decouple the associated receiver during the transmission of each pulse. Immediately after the transmission of each pulse, the T-R switch reverses these connections, which then obtain for the period during which reflected signals are to be received. A single triply resonant T-R switch may be employed, if desired.

Receivers 23, 24 and 25 are of the superheterodyne type and are shown in the drawing sub-divided into their major components. In most aspects the receivers are similar; however, each is arranged to receive a different frequency corresponding to that emitted by the transmitter with which it is associated. For example, if transmitters 11, 12 and 13 are generating carrier frequencies of 2000, 5000 and 8000 mc. respectively, then local oscillators 26, 27 and 28 may be conveniently arranged to generate frequencies of 2060, 5060 and 8060 mc. respectively. Or, if the transmitted frequencies are hormonically related, a single local oscillator may be employed specially constructed and arranged to generate strong harmonics as well as a strong fundamental.

Oscillations generated by local oscillators 26, 27 and 28 are mixed in conventional manner with the received signals in frequency converters 29, 30 and 31 and are amplified and detected in conventional I.-F. amplifier and detector circuits 32, 33 and 34. Video amplification may be provided by amplifiers 35, 36 and 37 and the output thereof applied to the intensity control electrodes of cathode ray tubes 39, 40 and 41 respectively. These tubes are components of an indicator system 38 which, in addition to the tubes, comprises semi-transparent mirrors 42, 43, sweep circuit 44 and the usual blanking circuit (not shown). Assuming the transmitted pulses are being emitted simultaneously from transmitters 11, 12 and 13, sweep circuit 44 is arranged to operate in conventional manner to simultaneously deflect the electron beams of tubes 39, 40 and 41 radially in PPI-scan presentation, the radius vector being synchronized with the antenna azimuth.

The fluorescent screens of cathode ray tubes 39, 40 and 41 are dark except when illuminated by electron bombardment, as when the grids are impressed with incoming signals of proper polarity. The fluorescent material comprising the screen of each tube is preferably different from the material comprising the screen of each of the other tubes. Or, each screen may be of the same fluorescent material and different color filters 45, 46 and 47 interposed in front thereof.

Under electron bombardment, the screen of tube 39 becomes illuminated in color B, the screen of tube 40 in color G, and the screen of tube 41 in color R. Colors B, G and R are preferably contrasting. By suitable means, the visual intelligences presented by screens 39, 40 and 41 are optically combined, as by being superposed upon each other so that the eye 48 of the observer sees a composite picture in which the signals from the different reflecting objects or surfaces are indicated in different colors and in different intensities, according to the strength with which each surface reflects each of the transmitted frequencies.

It will be understood that objects, such as buildings, ships, aircraft and the like, which reflect very strongly and substantially equally at all three transmitted frequencies, will illuminate each of the three screens brilliantly and with substantially equal intensity and will consequently appear in the composite picture in color W, where $W$ equals $B+G+R$. Surfaces such as roughened earth, which likewise reflect all three transmitted frequencies substantially equally but with considerably less strength than metal surfaces, will also illuminate each screen substantially equally but with considerably less brilliance. This type of reflecting surface will therefore appear relatively dimly illuminated in color W.

Surfaces such as clouds and rough water, which reflect most strongly at the highest of the three transmitted frequencies, will appear to the eye of the observer in a shade in which color R is predominant, whereas surfaces such as forests, which reflect most strongly at the lowest of the three transmitted frequencies, will appear in a shade in which color B is predominant.

Optical superpositioning of the images of tubes 39, 40 and 41 upon each other may be accomplished by any suitable, known means. In the drawing, cathode ray tubes 40 and 41 are placed at right angles to each other equi-distant from mirror element 42 which is placed at an angle of 45° to the axes. Mirror element 42 may be a lightly silvered semi-transparent mirror adapted to partially transmit and partially reflect light. The axis of the third cathode ray tube 39 is placed at right angles to the path of the light rays extending from mirror element 42 to the observer's eye 48. A second semi-transparent mirror element 43 is provided by means of which the image produced on the screen of tube 39 may be combined with the combined images from tubes 40 and 41. Tube 39 is so positioned that its screen is the same optical distance from observer's eye 48 as are the screens of tubes 40 and 41.

In the arrangement described above, the screens of all three cathode ray tubes are normally dark, i.e., un-illuminated in the absence of incoming signals. If desired, the circuits may be so arranged that all three screens are normally illuminated and the received signals employed to darken areas of the screens. If this be done, absence of signal will be indicated in the composite picture in color W, were $W$ equals $R+G+B$, while buildings and other metal reflecting surfaces will appear dark. Surfaces such as clouds which reflect the highest transmitted frequencies most strongly will appear in a color or shade in which color B predominates, whereas surfaces such as forests which reflect the lowest transmitted frequencies most strongly will appear in a shade in which color R predominates.

Another arrangement is to have the screens of some of the cathode ray tubes normally dark and others normally illuminated. For purposes of illustration, assume a system similar to that shown in the drawing but employing two, instead of three, different transmitted frequencies. Assume further that the screen of tube 40 is normally illuminated and the screen of tube 41 is normally dark. (Tube 39 and the receiver associated therewith are not employed in the present example.) In the absence of incoming signal the composite picture appears in color G. Signals from buildings and other metal objects, which reflect strongly both of the transmitted frequencies, will illuminate the screen of tube 41 and darken the screen of tube 40. Such objects will consequently appear in the composite picture in color R. Surfaces which reflect the higher frequencies more strongly, will appear in Y, a color containing both R and G, whereas surfaces which reflect the lower frequencies more strongly, will also appear in color Y but with considerably less brilliance.

In the various embodiments discussed hereinabove, the operation of the several transmitters has been described as being simultaneous and synchronous. It should be understood, however, that synchronous operation is not essential to my concept; it is quite possible to arrange the system so that the several transmitters fire in rapid sequence, preferably, altho not necessarily, without allowing time for an echo of a previously fired transmitter to return before the following transmitter is fired. Such an arrangement has an advantage over synchronously fired transmitters in that the system peak power, and hence the demand upon the system power supply, is substantially reduced. Of course, it is then desirable to stagger the sweep action of the various cathode ray tubes so as to coordinate the sweep of each tube with the firing of the transmitter with which it is associated, and this may be readily done, as by employing three separate sweep circuits, or by modifying the sweep circuit for three-phase action.

While I have illustrated and described the use of a plurality of cathode ray tubes having screens of different colors and/or having different color filters interposed in front thereof, various other arrangements, similar to those used in the television art, may be conveniently employed to obtain multi-color visual presentation.

Having described my invention, I claim:

1. Apparatus adapted to provide information regarding the physical properties, such as the material make-up, size and surface contours, of an unknown remote object as indicated by the electromagnetic-wave-reflectivity characteristics thereof, said apparatus comprising: means projecting toward said remote object, from a common location but at a plurality of substantially different carrier frequencies, electromagnetic wave energy in the form of discrete time-spaced pulses of substantially uniform amplitude, duration and repetition rate; means positioned at a common location for receiving reflections of said wave energy from said remote object at said plurality of carrier frequencies; selective means segregating said received wave energy into a plurality of channels in accordance with the carrier frequency thereof; means in each channel, responsive to the segregated wave energy therein, forming a colored visual indication of said remote object, said color being different and distinctive for each channel; and means optically combining said differently-colored visual indications into a composite indication the resultant color and intensity of which are functions of the carrier-wave-reflectivity characteristics of said remote object.

2. Apparatus adapted to provide information regarding the physical properties such as the material make-up, size and surface contours, of an unknown remote object as indicated by the electromagnetic-wave-reflectivity characteristics thereof, said apparatus comprising: means for projecting toward said remote object from a common location but at a plurality of substantially different carrier frequencies, electromagnetic wave energy in the form of discrete time-spaced pulses of substantially uniform amplitude, duration and repetition rate; means positioned at a common location for receiving reflections of said wave energy from said remote object at said plurality of carrier frequencies; selective means for segregating said received wave energy into a plurality of channels in accordance with the carrier frequency thereof; and a display means having associated therewith means responsive to the segregated wave energy in each channel for forming a colored intensity modulated presentation for each channel, the elemental areas of each presentation being positionally representative of corresponding elemental areas of said remote object, said color being different for each channel, the instantaneous amplitudes of the segregated signal in each channel being determinative of the intensity of corresponding elemental areas of the presentation for that channel, said display means being so constructed and arranged that said presentations may be viewed as a single image of composite color and intensity in which corresponding elemental areas of said presentations appear to be substantially superimposed on one another.

3. Apparatus adapted to provide information regarding the physical properties such as the material make-up, size and surface contours, of an unknown remote object as indicated by the electromagnetic-wave-reflectivity characteristics thereof, said apparatus comprising: means for projecting toward said remote object from a common location but at three substantially different carrier frequencies, electromagnetic wave energy in the form of discrete time-spaced pulses of substantially uniform amplitude, duration and repetition rate; means positioned at a common location for receiving reflections of said wave energy from said remote object at said three carrier frequencies; selective means segregating said received wave energy into three channels in accordance with the carrier frequency thereof; and a display means having associated therewith means responsive to the segregated wave energy in each channel for forming a colored intensity modulated presentation for each channel, the elemental areas of each presentation being positionally representative of corresponding elemental areas of said remote object, said color being different for each channel, the instantaneous amplitudes of the segregated signal in each channel being determinative of the intensity of corresponding elemental areas of the presentation in that channel, said display means being so constructed and arranged that said three presentations may be viewed as a single image of composite color and intensity in which corresponding elemental areas of said three presentations appear to be substantially superimposed on one another.

4. A radar system to detect at least one of a plurality of targets each reflecting energy at a preferential frequency comprising a plurality of signal sources each at a different frequency, means to transmit said plurality of frequencies, receiving means for detecting the reflected signals from at least one of said targets and means for deriving information signals representative of said targets from said detected signals in accordance with the frequency of said detected signals.

5. A radar system to detect at least one of a plurality of targets each reflecting energy at a preferential frequency comprising a plurality of signal sources each at a different frequency, means to transmit in sequence said plurality of frequencies, receiving means for detecting the reflected signals from at least one of said targets and means for deriving information signals representative of said targets from said detected signals in accordance with the frequency of said detected signals.

6. A radar system comprising a plurality of signal sources each at a different frequency, antenna means for directively radiating said signals, means for switching successively said plurality of sources to said antenna means, directive reception means for detecting signals reflected at said plurality of frequencies and means for deriving signals from said detected signals in accordance with said frequency.

7. In radar apparatus for systematically radiating meteorological conditions in a given area and for forming graphic representations of said conditions in response to electromagnetic energy reflected therefrom, the combination comprising means for sequentially altering the frequency of said radiating energy, means for deriving signals from said reflections in accordance with the frequency of said radiations for forming graphic representations of said conditions and objects and means responsive to said signals for coloring said representations as a function of the frequency of the reflected signals.

References Cited in the file of this patent

UNITED STATES PATENTS

| 2,253,292 | Goldsmith | Aug. 19, 1941 |
| 2,335,180 | Goldsmith | Nov. 23, 1943 |
| 2,344,296 | Frink | Mar. 14, 1944 |
| 2,408,415 | Donaldson | Oct. 1, 1946 |
| 2,408,848 | Hammond | Oct. 8, 1946 |
| 2,409,456 | Tolson | Oct. 15, 1946 |
| 2,412,669 | Bedford | Dec. 17, 1946 |
| 2,440,250 | Deloraine | Apr. 27, 1948 |